(12) United States Patent
Haga et al.

(10) Patent No.: US 10,079,520 B2
(45) Date of Patent: Sep. 18, 2018

(54) MOTOR

(71) Applicant: Nidec Corporation, Kyoto (JP)

(72) Inventors: Hidehiro Haga, Kyoto (JP); Ryusuke Sato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 22 days.

(21) Appl. No.: 15/472,322

(22) Filed: Mar. 29, 2017

(65) Prior Publication Data

US 2017/0201149 A1 Jul. 13, 2017

Related U.S. Application Data

(63) Continuation of application No. PCT/JP2015/069678, filed on Jul. 8, 2015.

(30) Foreign Application Priority Data

Sep. 30, 2014 (JP) .................. 2014-201414

(51) Int. Cl.
*H02K 3/28* (2006.01)
*H02K 5/22* (2006.01)
*H02K 3/50* (2006.01)
*H02K 7/08* (2006.01)
*H02K 11/21* (2016.01)

(52) U.S. Cl.
CPC ............. *H02K 5/225* (2013.01); *H02K 3/28* (2013.01); *H02K 3/50* (2013.01); *H02K 7/083* (2013.01); *H02K 11/21* (2016.01)

(58) Field of Classification Search
CPC ............ H02K 3/28; H02K 5/225; H02K 3/50; H02K 7/083; H02K 11/21
See application file for complete search history.

(56) References Cited

U.S. PATENT DOCUMENTS

| 6,268,669 | B1 * | 7/2001 | Wakao | ............... B62D 5/0406 |
| | | | | 310/67 R |
| 6,753,629 | B2 * | 6/2004 | Doi | ..................... H02K 5/161 |
| | | | | 310/156.05 |
| 6,931,957 | B2 | 8/2005 | Saito et al. | |

(Continued)

FOREIGN PATENT DOCUMENTS

| JP | 2004-248492 A | 9/2004 |
| JP | 2007-006592 A | 1/2007 |

(Continued)

OTHER PUBLICATIONS

Official Communication issued in corresponding International Application PCT/JP2015/069676, dated Sep. 29, 2015.

(Continued)

*Primary Examiner* — Dang Le

(74) *Attorney, Agent, or Firm* — Keating & Bennett, LLP

(57) ABSTRACT

A motor includes a bus bar holder with a main body portion, a connector portion protruding from the main body portion toward a radially outer side, and a connection terminal holding portion protruding from the main body inner surface toward a radially inner side. The main body portion is provided with a seal portion directly or indirectly contacting the cover along a circumferential direction of a center axis. A rib protruding toward a second side ahead of a circuit board is disposed at a surface of a second side of the connection terminal holding portion.

14 Claims, 8 Drawing Sheets

(56) References Cited

U.S. PATENT DOCUMENTS

| | | | |
|---|---|---|---|
| 7,193,343 B2* | 3/2007 | Tsuge | H02K 5/1735 |
| | | | 310/156.05 |
| 7,215,115 B2 | 5/2007 | Saito et al. | |
| 7,427,860 B2 | 9/2008 | Saito et al. | |
| 7,588,444 B2 | 9/2009 | Kataoka et al. | |
| 7,709,982 B2* | 5/2010 | Ohuchi | H02K 5/08 |
| | | | 310/71 |
| 7,763,998 B2* | 7/2010 | Makino | H02K 3/522 |
| | | | 310/71 |
| 7,990,001 B2 | 8/2011 | Hatano et al. | |
| 8,729,754 B2 | 5/2014 | Fujii et al. | |
| 8,963,388 B2 | 2/2015 | Miyachi et al. | |
| 9,045,156 B2 | 6/2015 | Omae et al. | |
| 9,509,196 B2 | 11/2016 | Yongzuo et al. | |
| 2015/0357886 A1 | 12/2015 | Ishizeki et al. | |

FOREIGN PATENT DOCUMENTS

| | | |
|---|---|---|
| JP | 2007-185055 A | 7/2007 |
| JP | 2007-221977 A | 8/2007 |
| JP | 2010-161863 A | 7/2010 |
| JP | 2010-172086 A | 8/2010 |
| JP | 4552254 B2 | 9/2010 |
| JP | 2013-153633 A | 8/2013 |
| JP | 2013-247761 A | 12/2013 |
| JP | 5386072 B2 | 1/2014 |
| JP | 2014-093835 A | 5/2014 |

OTHER PUBLICATIONS

Official Communication issued in corresponding International Application PCT/JP2015/076570, dated Dec. 8, 2015.
Official Communication issued in corresponding International Application PCT/JP2015/069677, dated Oct. 6, 2015.
Official Communication issued in corresponding International Application PCT/JP2015/069678, dated Sep. 15, 2015.
Official Communication issued in corresponding International Application PCT/JP2015/076571, dated Dec. 5, 2015.
Official Communication issued in corresponding International Application PCT/JP2015/076569, dated Dec. 2, 2015.
Hage, H. et al; "Motor"; U.S. Appl. No. 15/472,320; filed Mar. 29, 2017.
Haga, H. et al.; "Motor"; U.S. Appl. No. 15/472,321; filed Mar. 29, 2017.
Haga, H. et al.; "Motor"; U.S. Appl. No. 15/472,349; filed Mar. 29, 2017.
Haga, H. et al.; "Motor"; U.S. Appl. No. 15/472,323; filed Mar. 29, 2017.
Haga, H. et al.; "Motor"; U.S. Appl. No. 15/472,324; filed Mar. 29, 2017.

* cited by examiner

MOTOR

CROSS REFERENCE TO RELATED APPLICATIONS

This application claims the benefit of priority to Japanese Patent Application No. 2014-201414 filed on Sep. 30, 2014 and is a Continuation Application of PCT Application No. PCT/JP2015/069678 filed on Jul. 8, 2015. The entire contents of each application are hereby incorporated herein by reference.

BACKGROUND OF THE INVENTION

1. Field of the Invention

The present invention relates to a motor.

2. Description of the Related Art

A motor including a casing is well known in the art. An O-ring used as a seal member is disposed in the casing of the motor.

However, in the above-mentioned motor, a plug portion protrudes outward from the casing. If external force is applied to the plug portion, a molded material including the plug portion, and at least one of a holder base and a casing contacting the mold material through a seal member may be unavoidably deformed. As a result, sealability of the motor is deteriorated.

SUMMARY OF THE INVENTION

In accordance with a preferred embodiment of the present invention, a motor includes a rotor including a shaft with a center on a center axis extending in one direction; a stator enclosing the rotor and rotating the rotor about the center axis; a first bearing which is disposed at a first side in the one direction of the stator and supports the shaft; a second bearing which is disposed at a second side opposite to the first side of the stator and supports the shaft; and a cylindrical housing holding the stator and the first bearing; a bus bar assembly holding the second bearing, and allowing an end of the first side to be located in the housing; a cover fixed to the housing to cover at least a portion of the second side of the bus bar assembly; and a circuit board between the second bearing and the cover in the one direction, and allowing a surface of the second side to cross the one direction, wherein the bus bar assembly includes a bus bar electrically connected to the stator; a wiring member electrically connecting an external power supply to the circuit board; and a bus bar holder holding the bus bar and the connection terminal, the bus bar holder includes a cylindrical main body portion including an opening at the second side; a connector portion protruding from the main body portion toward a radially outer side of the center axis; and a connection terminal holding portion protruding from an inner surface of the main body portion toward the radially inner side, such that at least a portion of the connection terminal holding portion overlaps with the connector portion in the radial direction, the main body is provided with a seal portion directly or indirectly contacting the cover along a circumferential direction of the center axis, the wiring member includes an external power-supply connection terminal provided to the connector portion to be electrically connected to the external power-supply; and a circuit board connection terminal which is fixed to the connection terminal holding portion at the first side ahead of an end of the second side of the main body portion and is electrically connected to the circuit board, and the surface of the second side of the connection terminal holding portion is provided with a rib protruding toward the second side ahead of the circuit board.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Motors according to preferred embodiments of the present invention will hereinafter be described with reference to the attached drawings. Further, the scope of the present invention is not limited to the following preferred embodiments, but may be arbitrarily changed within the technical spirit of the present invention. To easily understand each component in the following drawings, actual structures, and a scale of each structure, the number of structures, etc., may be different.

Figure 1:
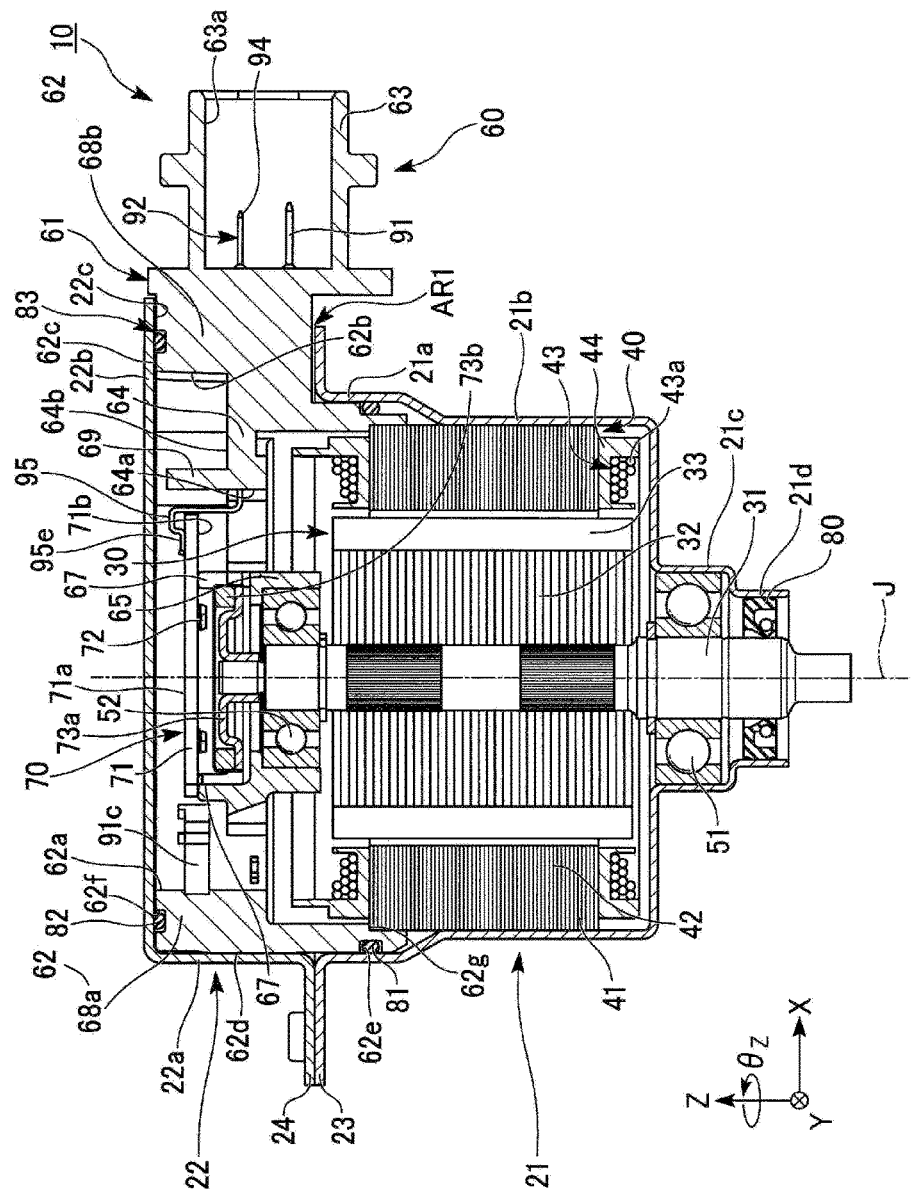
FIG. 1 is a cross-sectional view illustrating a motor according to a preferred embodiment of the present invention.

In the drawings, an X-Y-Z coordinate system is provided as an appropriate three-dimensional (3D) perpendicular coordinate system. In the X-Y-Z coordinate system, a direction parallel to the axial direction (one direction) of a center axis J shown in FIG. 1 will hereinafter be referred to as a Z-axis direction. A direction parallel to a longitudinal direction of a bus bar assembly 60 shown in FIG. 1, that is, the left-and-right direction of FIG. 1, is referred to as an X-axis direction. A direction parallel to a width direction of the bus bar assembly 60, that is, a direction perpendicular to both the X-axis direction and the Z-axis direction, is referred to as a Y-axis direction.

In the following description, a positive side of the Z-axis direction (+Z side, a second side) will hereinafter be defined as a "rear side" and a negative side of the Z-axis direction (−Z side, a first side) will hereinafter be defined as a "front side." It is to be understood that the descriptions of the rear side and the front side are used for explanation only, and they do not limit the actual location relation or direction.

Also, unless otherwise explained, a direction parallel to the center axis J (Z-axis direction) is simply referred to as an "axial direction," a radial direction having its center on the center axis J is simply referred to as a "radial direction," and a circumferential direction having its center on the center axis J, that is, the axial circumference of center axis J (θZ direction), is simply referred to as a "circumferential direction."

Further, herein, descriptions such as being axially extended do not only refer to a case of strictly being extended in the axial direction (Z-axis direction), but it may also include the other case of being extended in a direction inclined at less than 45° relative to the axial direction. Also, descriptions such as being radially extended do not only refer to a case of strictly being extended in the radial direction, that is, the direction perpendicular to the axial direction (Z-axis direction), but it may also include a case of being extended in a direction inclined at less than 45° relative to the radial direction.

Figure 2:
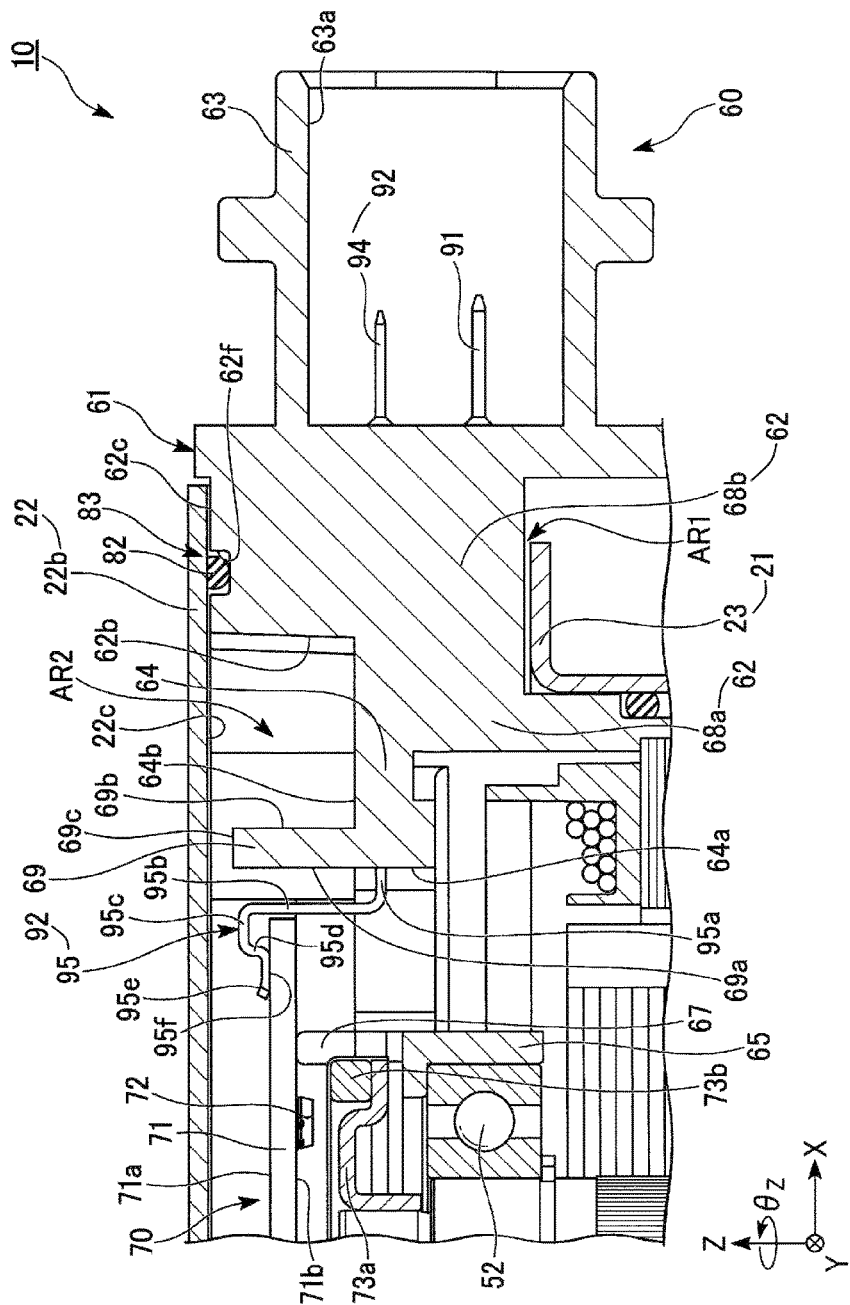
FIG. 2 is a view illustrating a motor according to a preferred embodiment of the present invention, and is a partially enlarged view of FIG. 1.

FIG. 1 is a cross-sectional view illustrating a motor 10 according to a preferred embodiment of the present invention. FIG. 2 is a cross-sectional view illustrating a portion of the motor 10, and is a partially enlarged view of the motor shown in FIG. 1. The motor 10 according to the present preferred embodiment is a brushless motor. As illustrated in FIG. 1, the motor 10 preferably includes a housing 21, a cover 22, a rotor 30 having a shaft 31, a stator 40, a first bearing 51, a second bearing 52, a controller 70, a bus bar assembly 60, and a plurality of O-rings. The plurality of O-rings preferably includes a front side O-ring 81 and a rear side O-ring 82.

The rotor 30, the stator 40, the first bearing 51, and the oil seal 80 are accommodated into the housing 21. The housing 21 is opened toward the rear side (+Z side). An end of the front side (−Z side) of the bus bar assembly 60 is inserted into the opening of the housing 21. The bus bar assembly 60 holds the second bearing 52. The first bearing 51 and the second bearing 52 support both sides of the axial direction (Z-axis direction) of the shaft 31.

The cover 22 covers at least a portion of the rear side (+Z side) of the bus bar assembly 60. The cover 22 is fixed to the housing 21. The cover 22 preferably includes a cylindrical portion 22a, a cover portion 22b, a front surface 22c of the cover, and a rear side flange portion 24. The controller 70 is located between the second bearing 52 and the cover 22. The front side O-ring 81 is located between the bus bar assembly 60 and the housing 21. The rear side O-ring 81 is located between the bus bar assembly and the cover 22. The above-mentioned components will hereinafter be described in greater detail below.

The housing 21 is preferably a cylindrical or substantially cylindrical member, and holds the stator 40 and the first bearing 51. In a preferred embodiment of the present invention, the housing 21 preferably has a multi-stepped cylindrical shape or a substantially multi-stepped cylindrical shape with open ends on both sides. In this preferred embodiment, a material of the housing 21 is, for example, metal. In more detail, it is preferred that a material of the housing 21 is, for example, aluminum, iron alloy, or the like.

The housing 21 preferably includes a housing flange portion 23, a bus bar assembly insertion portion 21a, a stator holding portion 21b, a front bearing holding portion 21c, and an oil seal holding portion 21d. The housing flange portion 23, the bus bar assembly insertion portion 21a, the stator holding portion 21b, the front bearing holding portion 21c, and the oil seal holding portion 21d are disposed in a direction from the rear side (+Z side) to a front side (−Z side) along the axial direction (Z-axis direction). That is, in the housing 21, the front side flange portion 23 is preferably disposed at a rearmost side and the oil seal holding portion 21d is preferably disposed at a frontmost side. Each of the bus bar assembly insertion portion 21a, the stator holding portion 21b, the front bearing holding portion 21c, and the oil seal holding portion 21d preferably has a concentric cylindrical or substantially cylindrical shape. Diameters of the above members are reduced in the order of the bus bar assembly insertion portion 21a, the stator holding portion 21b, the front bearing holding portion 21c, and the oil seal holding portion 21d.

The housing flange portion 23 extends from the end of the rear side (+Z side) of the bus bar assembly insertion portion 21a toward a radially outer side. That is, the housing 21 includes a housing flange portion 23 at the end of the rear side. The bus bar assembly insertion portion 21a encloses an end of a front side (−Z side) of the bus bar assembly 60 from the radially outer side of the center axis J. In other words, at least a portion of the end of the front side (−Z side) of the bus bar assembly 60 is disposed in the bus bar assembly insertion portion 21a. That is, the end of the front side of the bus bar assembly 60 is disposed in the housing 21.

An outer surface of a stator 40 (preferably an outer surface of a core back portion 41, to be described later) is fitted into an inner surface of the stator holding portion 21b. Accordingly, the stator 40 is fixed to the housing 21. The front bearing holding portion 21c holds the first bearing 51. In this preferred embodiment, the inner surface of the front bearing holding portion 21c is fitted into the outer surface of the first bearing 51. The oil seal 80 is held in the oil seat holding portion 21d.

The rotor 30 preferably includes a shaft 31, a rotor core 32, and a rotor magnet 33. The shaft 31 has its center on the center axis J which extends in one direction (Z-axis direction). According to this exemplary preferred embodiment, the shaft 31 is a cylindrical or substantially cylindrical member. Further, the shaft 31 may be a solid member or a hollow cylindrical member. The shaft 31 is rotatably supported around the axis (in ±θZ direction) by the first bearing 51 and the second bearing 52. The end of the front side (−Z side) of the shaft 31 protrudes to the outside of the housing 21. In the oil seal holding portion 21d, the oil seal 80 is disposed around the axis of the shaft 31.

The rotor core 32 is preferably a cylindrical or substantially cylindrical member. The rotor core 32 is fixed to the shaft 31 while enclosing the shaft 31 around the axis (in the θZ direction). In more detail, the rotor core 32 preferably includes a through-hole which penetrates axially through the rotor core 32. At least a portion of the shaft 31 is disposed within the through-hole of the rotor core 32. The shaft 31 is fixed to the rotor core 32 by, for example, press-fitting, adhesion, or the like. In more detail, according to this exemplary preferred embodiment, the rotor magnet 33 preferably has an annular or substantially annular shape. The outer surface of the rotor core 32 faces the inner surface of the rotor magnet 33. The rotor magnet 33 is fixed to the rotor core 32 by, for example, an adhesive, or the like. Further, the shape of the rotor magnet 33 is not necessarily annular. The rotor magnet 33 may be defined by a plurality of magnets arranged on an outer circumferential surface of the rotor core 32 in a circumferential direction. The rotor magnet 33 is fixed to an outer surface along an axis circumference of the rotor core 32. The rotor core 32 and the rotor magnet 33 rotate integrally with the shaft 31.

The stator 40 preferably has a cylindrical or substantially cylindrical shape. The rotor 30 is located in the stator 40. In other words, the stator 40 encloses the rotor 30 around the axis (in the θZ direction). The stator 40 rotates the rotor 30 in the circumferential direction of the center axis J The stator 40 preferably includes a core back portion 41, a plurality of teeth portions 42, a plurality of coils 43, and a plurality of bobbins 44. According to this exemplary preferred embodiment, the core back portion 41 and the teeth portion 42 is a stacked steel plate in which a plurality of electromagnetic steel plates are stacked.

The core back portion 41 may have a cylindrical or substantially cylindrical shape. Preferably, the shape of the core back portion 41 is concentric with the shaft 31. The teeth portion 42 extends from the inner surface of the core back portion 41 toward a radially inner side (that is, toward the shaft 31). Preferably, the teeth portions 42 are arranged at equal or substantially equal intervals in the inner surface of the core back portion 41 in the circumferential direction.

Preferably, the bobbin 44 is a cylindrical or substantially cylindrical member. Each bobbin 44 is respectively mounted on one of the teeth portions 42. Preferably, the bobbin is defined by at least two members engaged from an axial direction. Each coil 43 is disposed in each bobbin 44. Each coil 43 is provided by preferably winding a conductive wire 43a about a bobbin 44. Further, as the conductive wire 43a, a circular wire or a flat wire is preferably used.

The first bearing 51 is disposed at a front side (−Z side) of the stator 40. The first bearing 51 is held by the front bearing holding portion 21c. The second bearing 52 is disposed at the rear side (+Z side) opposite to the front side of the stator 40. The second bearing 52 is held by a rear bearing holding portion 65 of a bus bar holder 61 which will be described later.

The first bearing 51 and the second bearing 52 supports the shaft 31 of the rotor 30. According to this exemplary preferred embodiment, each of the first bearing 51 and the second bearing 52 is a ball bearing. However, the type of the first bearing 51 and the second bearing 52 is not particularly limited to the above bearing type. For example, different kinds of bearings such as a sleeve bearing and a fluid hydraulic bearing may also be used. Further, the type of bearing of the first bearing 51 may be different from that of the second bearing 52.

The oil seal 80 preferably is an annular or substantially annular member. The oil seal 80 is mounted in the oil seal holding portion 21d around the axis (in the θZ direction) of the shaft 31. In more detail, the oil seal 80 is disposed in the oil seal holding portion 21d. An end of an axial lower portion of the shaft 31 penetrates through the through-hole of the oil seal 80. The oil seal 80 is disposed between the oil seal holding portion 21d and the shaft 31. Therefore, the oil seal 80 may prevent water, oil, etc., from infiltrating from a gap between the oil seal holding portion 21d and the shaft 31 into the housing 20. The oil seal 80 is preferably made of, for example, a resin material. However, a configuration and a material of the oil seal 80 are not limited thereto, and therefore an oil seal of different kinds of configurations and materials may also be used.

The controller 70 controls driving operations of the motor 10. The controller 70 preferably includes the circuit board 71, a rotating sensor 72, a sensor magnet holding member 73a, and a sensor magnet 73b. That is, the motor 10 includes the circuit board 71, the rotation sensor 72, the sensor magnet holding member 73a, and the sensor magnet 73b.

The circuit board 71 is disposed on an extending line of the rear side (+Z side) of the shaft 31. The circuit board 71 is disposed between the second bearing 52 and the cover 22 in the axial direction (Z-axis direction). The circuit board 71 includes a circuit board rear surface 71a located at the rear side and a circuit board front surface 71b located at the front side (−Z side). The circuit board rear surface 71a and the circuit board front surface 71b are a main surface of the circuit board 71. That is, the circuit board front surface 71b and the circuit board rear surface 71a intersect with the center axis J (Z-axis). In this preferred embodiment, the main surface of the circuit board 71 is perpendicular to the axial direction. The circuit board rear surface 71a faces the cover front surface 22c.

The circuit board 71 is supported by the end of the rear side (+Z side) of a plurality of circuit board support portions 67 to be described later. At least one side of the main surface of the circuit board 71 is provided with a printed wiring (not shown). The circuit board 71 outputs, for example, a motor driving signal, etc.

The sensor magnet holding member 73a is an annular or substantially annular member. A hole at a center of the sensor magnet holding member 73a is fitted with a small diameter of the end of the rear side (+Z side) of the shaft 31. Accordingly, the position of the sensor magnet holding member 73a is determined on the basis of the shaft 31. Preferably, the sensor magnet holding member 73a is fixed to the shaft 31 by press-fitting, adhesion, etc. The sensor magnet holding member 73a may rotate along with the shaft 31.

The sensor magnet 73b preferably has an annular or substantially annular shape. An N pole and an S pole of the sensor magnet 73b are alternately disposed in the circumferential direction. The sensor magnet 73b is fitted on an outer circumferential surface of the sensor magnet holding member 73a. In more detail, at least a portion of the sensor magnet 73b comes in contact with the outer circumferential surface of the sensor magnet holding member 73a. Therefore, the sensor magnet 73b is fixed to the sensor magnet holding member 73a. As a result, the sensor magnet 73b is disposed at the circumference (±θZ direction) of the shaft 31 at the rear side (+Z side) of the second bearing 52 such that the sensor magnet 73b is able to rotate along with the shaft 31.

At least one rotation sensor 72 is preferably mounted on the front surface 71b of the circuit board. The rotation sensor faces the sensor magnet 73b in the axial direction (Z-axis direction). The rotation sensor 72 detects the position of the rotor depending on a change in magnetic flux of the sensor magnet 73b. Although not illustrated, according to the exemplary preferred embodiment, three rotation sensors 72 are disposed on, for example, the front surface 71b of the circuit board. Further, as the rotation sensor 72, for example, a hall device, etc., is used.

Figure 3:
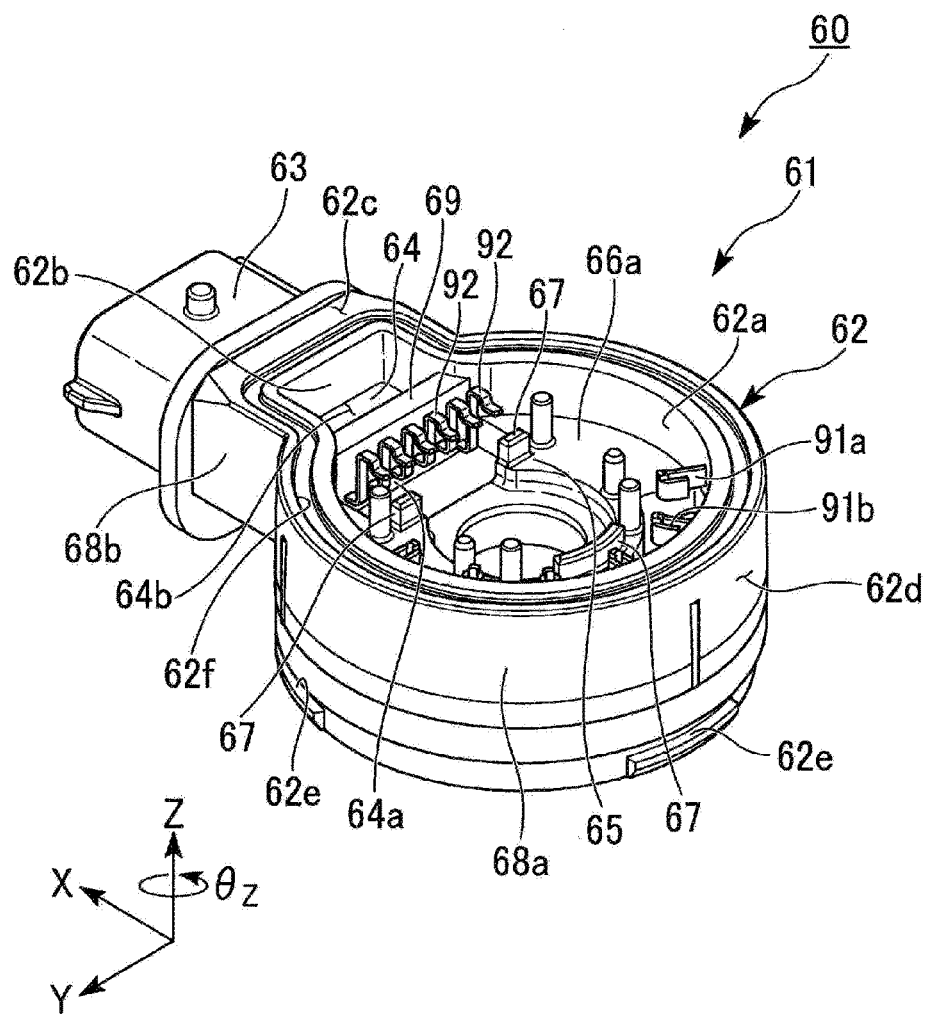
FIG. 3 is a perspective view illustrating a bus bar assembly according to a preferred embodiment of the present invention.
Figure 4:
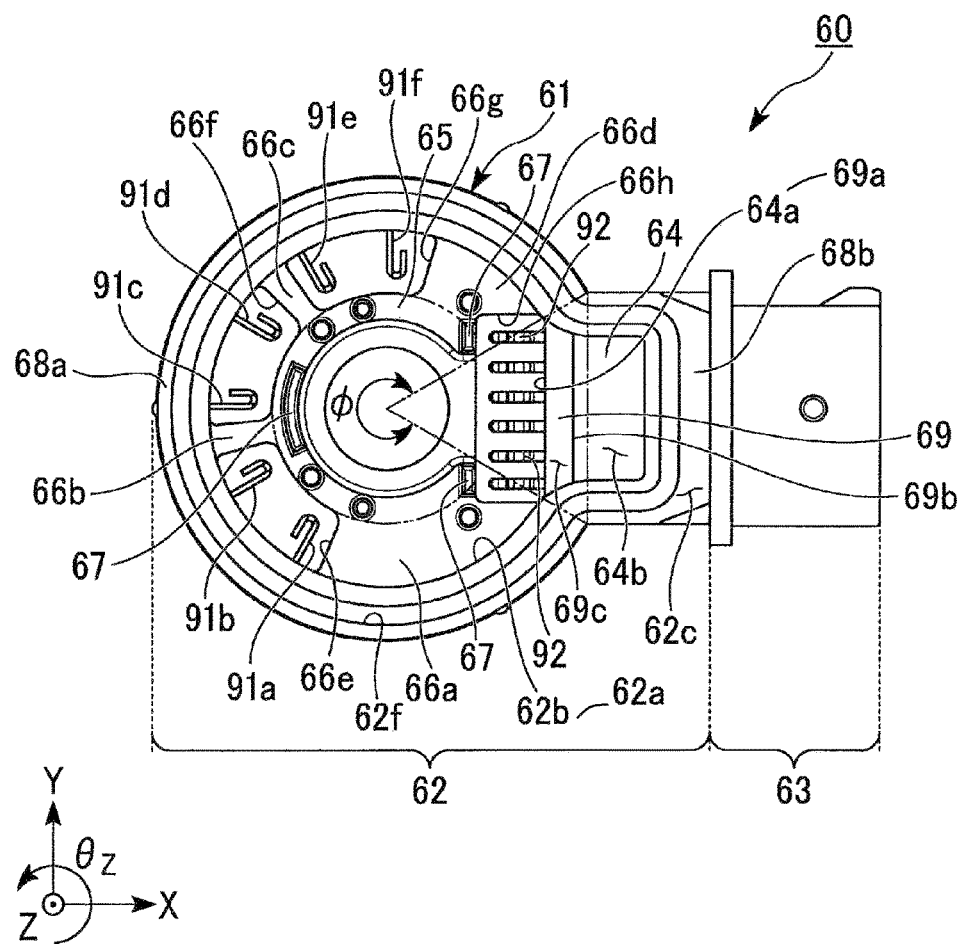
FIG. 4 is a plan view illustrating the bus bar assembly according to a preferred embodiment of the present invention.

FIG. 3 is a perspective view illustrating the bus bar assembly 60. FIG. 4 is a plan view illustrating a bus bar assembly 60. As illustrated in FIGS. 1 to 4, The bus bar assembly 60 supplies a driving current from an external power source to the stator 40. The bus bar assembly 60 preferably includes a bus bar holder 61, at least one bus bar 91, and a wiring member 92. In addition, in this preferred embodiment, the bus bar assembly 60 includes a plurality of bus bars 91.

The bus bar holder 61 is preferably defined by a holder made of resin. Preferably, a material defining the bus bar holder is an electrically insulating resin. The bus bar holder 61 holds the bus bar 91 and the wiring member 92. As illustrated in FIG. 1, a rear side (+Z side) of the bus bar holder 61 is accommodated in the cylindrical portion 22a. In this preferred embodiment, the bus bar holder 61 is press-fitted into the cylindrical portion 22a. At least a portion of a front side (−Z side) of the bus bar holder 61 is accommodated in the bus bar assembly insertion portion 21a of the housing 21.

As long as a material defining the bus bar holder 61 has insulating properties, any material may be used without being specially limited. The bus bar holder 61 is preferably manufactured as a single monolithic member by, for example, injection molding. As illustrated in FIGS. 3 and 4, the bus bar holder 61 includes a main body portion 62, a connector portion 63, a connection terminal holding portion 64, a rear bearing holding portion 65, connection portions 66a, 66b, 66c, and 66d, and a plurality of circuit board support portions 67, and a rib 69.

As illustrated in FIG. 1, the main body portion 62 preferably has a cylindrical or substantially cylindrical shape enclosing the center axis J in the circumferential direction (θZ direction). In the present preferred embodiment, the main body portion 62 has a cylindrical shape. The main body portion 62 preferably includes an opening 62a at the rear side (+Z side), a main body inner surface 62b, a main body rear surface 62c located at the rear side, and a main body outer surface 62d. The main body portion 62 encloses the end of the rear side of the rotor 30 and the end of the rear side of the stator 40 in the circumferential direction. That is, a portion of the rear side of the rotor 30 and a portion of the rear side of the stator 40 is located in the front side (−Z side) of the main body portion 62.

A stepped portion 62g in which an inner diameter of the main body portion 62 increases from the rear side (+Z side) to the front side is provided to the inner surface of the end of the front side (−Z side) of the main body portion 62. A stepped surface perpendicular to the axial direction (Z-axis direction) of the stepped portion 62g contacts the end of the rear side of the core-back portion 41 (+Z side). Therefore, the bus bar holder 61 contacts the end of the rear side of the stator 40. The bus bar holder 61 contacts the stator 40 such that the axial position of the bus bar holder 61 is decided.

As illustrated in FIGS. 1 and 2, a seal portion 83 is disposed in the main body portion 62. In the present preferred embodiment, the seal portion 83 is preferably disposed at the main body rear surface 62c.

As illustrated in FIGS. 3 and 4, the seal portion 83 seals the spacing between the cover 22 and the bus bar holder 61. In this preferred embodiment, a groove portion 62f is disposed in the seal portion 83. The groove portion 62f is provided over a circumference along the exterior of the main body portion 62 enclosing the opening 62a.

As illustrated in FIGS. 1 and 2, the rear side O-ring 82 is fitted into the groove portion 62f. That is, the rear side O-ring 82 is disposed in the seal portion 83. As a result, the seal portion 83 indirectly contacts the cover 22 through the rear side O-ring 82 along a circumferential direction of the center axis J.

As illustrated in FIG. 3, an O-ring holding portion 62e is disposed in the front side (−Z side) of the main body outer surface 62d. As illustrated in FIG. 1, the front side O-ring 81 is preferably fitted into the O-ring holding portion 62e.

As illustrated in FIGS. 3 and 4, the main body portion preferably includes an arc portion 68a and a connector connection portion 68b. As illustrated in FIG. 4, the shape of a cross section (XY cross-section) perpendicular to the center axis J of the arc portion 68a and the shape of a plan view (XY plan view) are an arc shape. The shape of a cross section (XY cross-section) perpendicular to the center axis J of the arc portion 68a and the shape of a plan view (XY plan view) are concentric with the rear bearing holding portion 65. Preferably, the shape of a cross section (XY cross-section) perpendicular to the center axis J of the arc portion 68a and the shape of a plan view (XY plan view) are an arc shape having a center angle of φ240° or higher. As illustrated in FIG. 1, the arc portion 68a is press-fitted into the cylindrical portion 22a.

As illustrated in FIGS. 3 and 4, the connector connection portion 68b is a portion connected to the connector portion 63. The connector connection portion 68b is convex toward the connector portion 63 (+X side). The connector connection portion 68b is connected to both ends of the arc portion 68a. As illustrated in FIGS. 1 and 2, a gap AR1 is disposed between the connector connection portion 68b and the housing flange portion 23 of the housing 21 in the axial direction (Z-axis direction). That is, the gap AR1 is defined between the connector connection portion 68b and the housing 21 in the axial direction.

The rear bearing holding portion 65 is disposed in the main body portion 62 along the radial direction. The rear bearing holding portion 65 holds the second bearing 52. As illustrated in FIG. 4, the connection portions 66a, 66b, 66c, and 66d connect the main body portion 62 to the rear bearing holding portion 65 disposed in the main body portion 62. The connection portions 66a-66d are positioned at the circumference of the rear bearing holding portion 65 while being spaced apart from each other at equal or substantially equal intervals along the circumferential direction.

Gaps 66e, 66f, 66g, and 66h are provided among the connection portions 66a-66d neighboring with each other in the circumferential direction. That is, gaps 66e, 66f, 66g, and 66h are provided between the rear bearing holding portion 65 and the main body portion 62. The gap 66e is defined by the connection portion 66a, the connection portion 66b, the main body portion 62, and the rear bearing holding portion 65. The gap 66f is defined by the connection portion 66b, the connection portion 66c, the main body portion 62, and the rear bearing holding portion 65. The gap 66g is defined by the connection portion 66c, the connection portion 66d, the main body portion 62, and the rear bearing holding portion 65. The gap 66h is defined by the connection portion 66d, the rear bearing holding portion 65, the connection portion 66a, the connection terminal holding portion 64, and the main body portion 62.

In a plan view, the position of the gap 66e is a position including coil connection portions 91a and 91b to be described later. In a plan view, the position of the gap 66f is a position including coil connection portions 91c and 91d to be described later. In a plan view, the position of the gap 66g is a position including coil connection portions 91e and 91f to be described later. In a plan view, the position of the gap 66h is a position including a circuit board connection terminal 95 to be described later. In a plan view, the gap 66h preferably has a rectangular or substantially rectangular shape.

As illustrated in FIGS. 3 and 4, the circuit board support portions 67 protrude from the surface of the rear side (+Z side) of the rear bearing holding portion 65 toward the rear side. In illustrated in FIG. 4, three circuit board support portions 67 are preferably disposed on the surface of the rear side of the rear bearing holding portion 65. The circuit board support portion 67 supports the circuit board 71 at the end of the rear side.

As illustrated in FIGS. 1 and 2, the connector portion is connected to external power supply (not shown). The connector portion 63 extends from a portion of the outer surface of the connector connection portion 68b toward the radially outer side (+X side) of the center axis J. That is, the connector portion 63 protrudes from the main body portion 62 toward the radially outer side of the center axis J. The connector portion 63 is located at the rear side (+Z side) ahead of the housing 21. The connector portion 63 preferably has a rectangular parallelepiped or substantially rectangular parallelepiped shape. The connector portion 63 is opened toward the radially outer side (+X side). The entirety of the connector portion 63 is exposed outside the cover 22.

As illustrated in FIG. 1, the connector portion 63 is opened toward one side (+X side) disposed in a longitudinal direction of the bus bar holder 61. The connector portion 63 preferably includes an opening 63a for a power supply. The bus bar 91 and the external power-supply connection terminal 94 to be described later toward protrude from the bottom surface of the power-supply opening 63a.

As illustrated in FIGS. 2 to 4, the connection terminal holding portion 64 preferably has a rectangular or substantially rectangular parallelepiped shape protruding toward the radially inner side from the main body inner surface 62b. In more detail, as illustrated in FIG. 4, the connection terminal holding portion extends from the inner surface of the connector connection portion 68b in the direction (−X direction) opposite to the direction in which the connector portion 63 extends. Accordingly, at least a portion of the connection terminal holding portion 64 overlaps with the connector portion 63 in the radial direction. The connection terminal holding portion 64 includes a holding portion inner surface 64a located at the radially inner side, and a holding portion rear surface 64b located at the rear side (+Z side). As illustrated in FIG. 2, the holding portion rear surface 64b is located at the front side ahead of the main body rear surface 62c in the axial direction (Z-axis direction).

The rib 69 is disposed at the holding portion rear surface 64b. The rib 69 protrudes from the holding portion rear surface 64b toward the rear side ahead of the circuit board 71. The rib 69 includes a rib inner surface 69a, a rib outer surface 69b located at the radially outer side, and a rib protrusion surface 69c. That is, the rib protrusion surface 69c is located at the rear side ahead of the circuit board rear surface 71a. In the present preferred embodiment, the rib 69 protrudes toward the rear side ahead of the circuit board connection terminal 95 to be described later. The rib protrusion surface 69c is located at the front side (−Z side) ahead of the main body rear surface 62c. In the present preferred embodiment, for example, the rib 69 preferably has a rectangular parallelepiped or substantially rectangular parallelepiped shape. The rib 69 extends in the direction perpendicular to the holding portion rear surface 64b.

In the present preferred embodiment, the rib 69 is disposed at the end of the radially inner side of the connection terminal holding portion 64. The rib inner surface 69a is connected to the holding portion inner surface 64a without a step difference therebetween. That is, the rib inner surface 69a and the holding portion inner surface 64a construct one seamless surface.

As illustrated in FIG. 4, the rib 69 extends in the direction crossing the protrusion direction (X-axis direction) of the connector portion 63. The rib 69 extends in the direction (Y-axis direction) perpendicular or substantially perpendicular to the protrusion direction of the connector portion 63. The rib 69 is connected to the main body inner surface 62b. In more detail, both ends of the extension direction (Y-axis direction at the rib 69 is connected to the inner surface of the arc portion 68a.

The gap AR2 is preferably located at the radially outer side of the rib 69. The AR2 is a space enclosed by the rib outer surface 69b, the main body inner surface 62b, and the holding portion rear surface 64b.

The bus bar 91 is a thin plate-shaped member made of an electrically conductive material (for example, metal, etc.). At least one bus bar 91 is electrically connected to the stator 40. The driving current is supplied to the stator 40. According to this preferred embodiment, a plurality of bus bars 91 are connected to the stator 40. For example, if the motor is a three-phase motor, at least three bus bars 91 are attached to the stator 40. In addition, according to a difference in coil wiring methods, the number of bus bars 91 may be properly changed to, for example, 4 or higher. Each bus bar 91 is disposed in the bus bar holder 61. As illustrated in FIG. 1, one end of the bus bar 91 protrudes from the bottom surface of the power-supply opening 63a, and is exposed outside the cover 22. For example, the external power supply is connected to one end of the bus bar 91 exposed to the outside.

As illustrated in FIG. 4, the plurality of bus bars 91 include coil connection portions 91a, 91b, 91c, 91d, 91e, and 91f. The coil connection portions 91a-91f are disposed at the other end of the plurality of bus bars 91. The coil connection portions 91a-91f protrude from the main body inner surface 62b. In more detail, the coil connection portions 91a-91f protrude from the inner surface of the arc portion 68a toward the radially inner side. In the circumferential direction, the positions of the coil connection portions 91a-91f are different from that of the connection terminal holding portion 64.

As illustrated in FIG. 1, the end of the rear side (+Z side) of the coil connection portion 91c is located at the rear side ahead of the circuit board front surface 71b. At least a portion of the coil connection portion 91c overlaps with the circuit board 71 in the radial direction. The coil connection portion 91c is electrically connected to the coil 43 through a connection member (not shown). Accordingly, the bus bar 91 is electrically connected to the stator 40. In the above-mentioned description, the coil connection portions 91a, 91b, and 91d-91f are preferably identical in structure to the coil connection portion 91c, and as such a detailed description thereof will herein be omitted.

As illustrated in FIG. 2, the wiring member 92 is partially embedded in the bus bar holder 61. The wiring member 92 is fixed to the bus bar holder 61. The wiring member 92 electrically connects the external power supply (not shown) to the circuit board 71. The wiring member 92 includes the external power-supply connection terminal 94 and the circuit board connection terminal 95. The external power-supply connection terminal 94 and the circuit board connection terminal 95 is exposed from the bus bar holder 61.

The external power-supply connection terminal 94 is disposed in the connector portion 63. The external power-supply connection terminal 94 protrudes from the bottom surface of the power-supply opening 63a. The external power-supply connection terminal 94 is electrically connected to the external power supply (not shown).

The circuit board connection terminal 95 protrudes from the holding portion inner surface 64a. The circuit board connection terminal 95 is fixed to the connection terminal holding portion 64 at the front side (−Z side) ahead of the end of the rear side (+Z side) of the main body portion 62. That is, the circuit board connection terminal 95 is preferably fixed to the connection terminal holding portion 64 at the front side (−Z side) ahead of the main body rear surface 62c. The circuit board connection terminal 95 preferably includes a first terminal portion 95a, a second terminal portion 95b, a third terminal portion 95c, a fourth terminal portion 95d, and a plate-shaped portion 95e.

The first terminal portion 95a protrudes toward the radially inner side from the holding portion inner surface 64a. The first terminal portion 95a is located at the outside of the radial direction ahead of the circuit board 71. The second terminal portion 95b extends from the end of the inner side of the radial direction of the first terminal portion 95a toward the rear side (+Z side). The second terminal portion 95b extends to a further rear side ahead of the circuit board rear surface 71a.

The third terminal portion 95c extends from the end of the rear side (+Z side) of the second terminal portion 95b toward the radially inner side. The fourth terminal portion 95d extends from the third terminal portion 95c to the front side (−Z side).

The plate-shaped portion 95e extends from the end of the front side (−Z side) of the fourth terminal portion 95d toward the radially inner side. The plate-shaped portion 95e is disposed at the end of the radially inner side of the circuit board connection terminal 95. The plate-shaped portion 95e preferably includes a connection surface 95f. The connection surface 95f is parallel to the circuit board rear surface 71a. The connection surface 95f contacts the circuit board rear surface 71a. Although not shown in the drawings, the plate-shaped portion 95e is preferably fixed to the circuit board 71 by, for example, soldering. Therefore, the circuit board connection terminal 95 is electrically connected to the circuit board 71. In other words, the wiring member 92 is electrically connected to the circuit board 71.

As illustrated in FIG. 4, in the circumferential direction (θZ direction) of the center axis J, the position of the circuit board connection terminal 95 is different from those of the coil connection portions 91a-91f of the bus bar 91.

As illustrated in FIG. 1, the front side O-ring 81 is preferably disposed in the housing 21. The front side O-ring 81 is fixed to the O-ring holding portion 62e. The front side O-ring 81 comes in contact with the inner surface of the housing 21 and the outer surface of the main body portion 62 over its circumference. That is, the front side O-ring 81 preferably contacts the main body portion 62 and the housing 21 over its circumference. Stress generated from the inner surface of the bus bar assembly insertion portion 21a is loaded on the front side O-ring 81.

The rear side O-ring 82 is disposed in the cover 22. As described above, the rear side O-ring 82 is located at the seal portion 83 disposed in the main body portion 62. The rear side O-ring 82 is fitted into the groove portion 62f. The entire circumference of the rear side O-ring 82 preferably contacts the cover front surface 22c to be described later. Stress generated from the cover front surface 22c is loaded on the rear side O-ring 82.

A configuration of the front side O-ring 81 and the rear side O-ring 82 is not limited thereto, and other O-rings may also be used. In this preferred embodiment, the front side O-ring 81 and the rear side O-ring 82 may preferably be made of, for example, resin material including silicon rubber or the like. If the O-rings 81 and 82 are made of silicon rubber, the front side O-ring 81 and the rear side O-ring 82 are preferably manufactured by, for example, machining elongated silicon rubber having a round cross section in a ring shape.

The cover 22 is attached to the rear side (+Z side) of the housing 21. The cover 22 is preferably made of, for example, metal. Specifically, the cover 22 is made of, for example, aluminum (Al) or an iron alloy such as SUS. As described above, the cover 22 preferably includes a cylindrical portion 22a, a cover portion 22b, and a cover flange portion 24.

The cylindrical portion 22a is opened toward the front side (−Z side). The cylindrical portion 22a encloses the bus bar assembly 60 from the radially outer side of the center axis J. In more detail, the cylindrical portion 22a encloses the end of the rear side (+Z side) of the main body portion 62 from the radially outer side of the center axis J. In other words, at least a portion of the end of the rear side (+Z side) of the main body portion 62 is disposed in the cylindrical portion 22a. The cylindrical portion 22a is connected to the end of the rear side (+Z side) of the bus bar assembly insertion portion 21a through the housing flange portion 23 and the cover flange portion 24.

The cover portion 22b is connected to the end of the rear side (+Z side) of the cylindrical portion 22a. In the present preferred embodiment, the cover portion 22b preferably has a flat plate shape. The cover portion 22b covers the entirety of the rear side (+Z side) of the main body portion 62. The cover portion 22b closes the opening 62a.

The cover front surface 22c is located at the front side (−Z side) of the cover portion 22b. The cover front surface 22c preferably contacts the entire circumference of the rear side O-ring 82. Therefore, the cover 22 indirectly contacts the seal portion 83 through the rear side O-ring 82 over a circumference of the opening 62a.

The cover flange portion 24 extends from the end of the front side (−Z side) of the cylindrical portion 22a toward the radially outer side. That is, the cover 22 has a cover flange portion 24 at the end of the front side. The cover flange portion 24 overlaps with the housing flange portion 23. The cover flange portion 24 is preferably fixed to the housing flange portion 23 by, for example, welding, caulking, adhesion, screwing, etc. As a result, the housing 21 is welded to the cover 22.

For example, the external power supply is connected to the motor 10 through the connector portion 63. The connected external power is electrically connected to the bus bar 91 and the wiring member 92. Therefore, the driving current is supplied from the external power supply to the coil 43 and the rotation sensor 72 through the bus bar 91 and the wiring member 92. The rotation sensor 72 detects the magnetic flux of the rotor magnet. The driving current supplied to the coil 43 is controlled depending on the rotating position of the rotor 30 calculated based on, for example, the detected magnetic flux of the rotor magnet. When the driving current is supplied to the coil 43, a magnetic field is generated in the coil 43. In other words, when the driving current is supplied to the coil 43, a torque is generated between the rotor 30 and the stator 40. With this torque, the rotor 30 and the shaft 31 rotates. By doing so, the motor 10 obtains a rotational driving force.

In the present preferred embodiment, the seal portion 83 is preferably disposed in the main body rear surface 62c. The cover 22 indirectly contacts the seal portion 83 through the rear side O-ring 82. Therefore, spacing between the cover 22 and the bus bar holder 61 is sealed. As a result, water, oil, or the like can be prevented from flowing into the motor 10.

In addition, in the present preferred embodiment, the rib 69 is preferably disposed at the connection terminal holding portion 64. Therefore, rigidity of the connection terminal holding portion 64 can be improved. As a result, when an external force is applied to the connector portion 63, deformation of the connection terminal holding portion 64 is able to be significantly reduced or prevented. Further, the connection terminal holding portion 64 is able to is able to significantly reduce or prevent deformation of the connected main body portion 62, and sealability reduction by the seal portion 83. Therefore, according to motor in the present preferred embodiment, sealability reduction can be prevented.

In addition, according to this preferred embodiment, the rib 69 protrudes toward the rear side ahead of the circuit board 71. Therefore, for example, although the cover 22 is crushed and deformed toward the front side, the deformed cover 22 easily contacts the rib 69 at a time earlier than the circuit board 71. As a result, the circuit board 71 can be prevented from being damaged by the deformed cover 22.

In addition, according to the present preferred embodiment, the rib 69 protrudes toward the rear side ahead of the circuit board connection terminal 95 connected to the circuit board rear surface 71a. Therefore, although the cover 22 is deformed in the same manner as described above, the deformed cover 22 contacts the rib 69 at a time earlier than the circuit board connection terminal 95. Therefore, according to the present preferred embodiment, an electrical connection between the circuit board 71 and the circuit board connection terminal 95 can be prevented from being disengaged by the deformed cover 22.

In addition, according to the present preferred embodiment, the rib 69 is connected to the main body inner surface 62b, resulting in improved rigidity of the main body portion 62. Therefore, when external force is applied to the connector portion 63, deformation of the main body portion 62 is able to be significantly reduced or prevented. Therefore, according to the present preferred embodiment, reduction of sealability between the cover 22 and the bus bar holder 61 can be prevented.

In addition, according to the present preferred embodiment, the rib 69 extends in the direction crossing the protrusion direction of the connector portion 63. Therefore, both ends of the extension direction of the rib 69 easily contacts the main body inner surface 62b of the main body portion 62.

In addition, according to the present preferred embodiment, the bus bar holder 61 contacts the end of the rear side of the stator 40, such that the position of the axial direction is determined. When the position of the axial direction of the bus bar holder 61 is determined by the stator 40, if the connector connection portion 68b contacts the housing 21 before the bus bar holder 61 contacts the stator 40, the bus bar holder 61 cannot perform the above position decision by the stator 40. However, according to present preferred embodiments of the present invention, a gap AR1 is defined between the connector connection portion 68b and the housing 21. As a result, the connector connection portion 68b can be prevented from contacting the housing 21.

If the gap AR1 is defined between the connector connection portion 68b and the housing 21, the connector connection portion 68b does not contact the housing 21. Therefore, the connector connection portion 68b is not supported by the housing 21 from the front side. Therefore, for example, when external force from the rear side is applied to the connector portion 63, the connector connection portion 68b is easily curved toward the front side, resulting in deformation of the connector connection portion 68b.

In contrast, according to the present preferred embodiment, deformation of the main body portion 62 is able to be significantly reduced or prevented by the rib 69 as described above. That is, when a structure in which the connector connection portion 68b is easily deformed is used (i.e., when the gap AR1 between the connector connection portion 68b and the housing 21 is defined), reduction of sealability is able to be significantly reduced or prevented.

In addition, according to the present preferred embodiment, the holding portion rear surface 64b is located at the front side ahead of the main body rear surface 62c. Therefore, as illustrated in FIGS. 1 and 2, the circuit board 71 is easily disposed in the main body portion 62. As a result, the cover 22 is located at the rear side of the main body portion 62, such that the cover portion 22b may be provided in a plate shape and the spacing between the main body portion 62 and the cover 22 may be sealed by the seal portion 83. Therefore, according to the present preferred embodiment, the shape of the cover 22 can be simplified, and sealability between the cover 22 and the bus bar holder 61 can be improved.

In addition, according to the present preferred embodiment, the cover 22 preferably includes a cover flange portion 24. The housing 21 preferably includes a housing flange portion 23. The cover flange portion 24 is fixed to the housing flange portion 23. Therefore, the cover 22 and the housing 21 can be strongly fixed, resulting in improved sealability of the motor 10.

In addition, according to the present preferred embodiment, at least a portion of the coil connection portions 91a-91f overlaps with the circuit board 71 in the radial direction. Therefore, an axial thickness of the motor 10 can be reduced.

In addition, according to the present preferred embodiment, the circuit board connection terminal 95 and the coil connection portions 91a-91f are disposed at different positions in the circumferential direction of the center axis J. Therefore, when the circuit board connection terminal 95 is connected to the circuit board 71, and when the coil connection portions 91a-91f are connected to the coil 43, mutual interference between the circuit board connection terminal 95 and the coil connection portions 91a-91f may be significantly reduced or prevented. As a result, each connection can be easily performed out.

In addition, the circuit board connection terminal 95 preferably includes a plate-shaped portion 95e. The connection surface 95f contacts the circuit board rear surface 71a. Therefore, according to the present preferred embodiment, a contact region between the circuit board connection terminal 95 and the circuit board 71 can be enlarged, such that the circuit board connection terminal 95 can be stably fixed to the circuit board 71.

In addition, according to the present preferred embodiment, the rear side O-ring 82 is disposed in the seal portion 83. Therefore, sealability between the cover 22 and the bus bar holder 61 can be improved.

Further, the following elements can be used in the present preferred embodiment.

In the above-mentioned description, the rear side O-ring 82 is used as a seal member mounted to the seal portion 83. For example, a liquid gasket or the like may be used as the seal member disposed in the seal portion 83. The scope of a member that seals a gap between the housing 21 and the bus bar holder 61 is not limited to the above-mentioned member, and a liquid gasket and the like may also be applied to the seal member.

If the liquid gasket is used as the seal member mounted to the seal portion 83, the seal portion 83 directly contacts the cover front surface 22c. That is, according to the present preferred embodiment, the seal portion 83 may directly or indirectly contact the cover 22 along the circumferential direction of the center axis J.

In addition, according to the present preferred embodiment, in the seal portion 83, if a space between the cover 22 and the bus bar holder 61 is sealed, the seal member may not be disposed in the seal portion 83. For example, the seal portion 83 is pressed down by the cover front surface 22c, thereby the spacing between the cover 22 and the bus bar holder 61 may be sealed.

In addition, in the present preferred embodiment, the gap AR1 may not be constructed. The cover 22 may not include the cover flange portion 24. The housing 21 may not include the housing flange portion 23.

In addition, in the above-mentioned description, the circuit board 71 is disposed at the rear side of the shaft 31. However, the position of the circuit board 71 is not limited to the above-mentioned position. For example, a through-hole may be defined in the circuit board 71, and the shaft 31 may be inserted into the through-hole. The end of the rear side of the shaft 31 may protrude toward the rear side of the circuit board 71.

The rib 69 may be connected to the main body portion 62 at only one end of the extension direction, and may not be connected to the main body portion 62 at both ends of the extension direction. The rib protrusion surface 69c may also be located at the rear side ahead of the main body rear surface 62c.

The shape of the rib 69 is not limited thereto. For example, the rib 69 may have a cylindrical shape, or may be provided by a polygonal pillar, for example. The rib 69 may be tilted and extended with respect to the holding portion rear surface 64b.

In addition, the elements shown in FIGS. 5 to 8 may be used in the present preferred embodiment. Further, in the following description, the same components as those of the above-mentioned preferred embodiment are denoted with the same reference numbers and therefore the description of thereof may be omitted.

Figure 5:
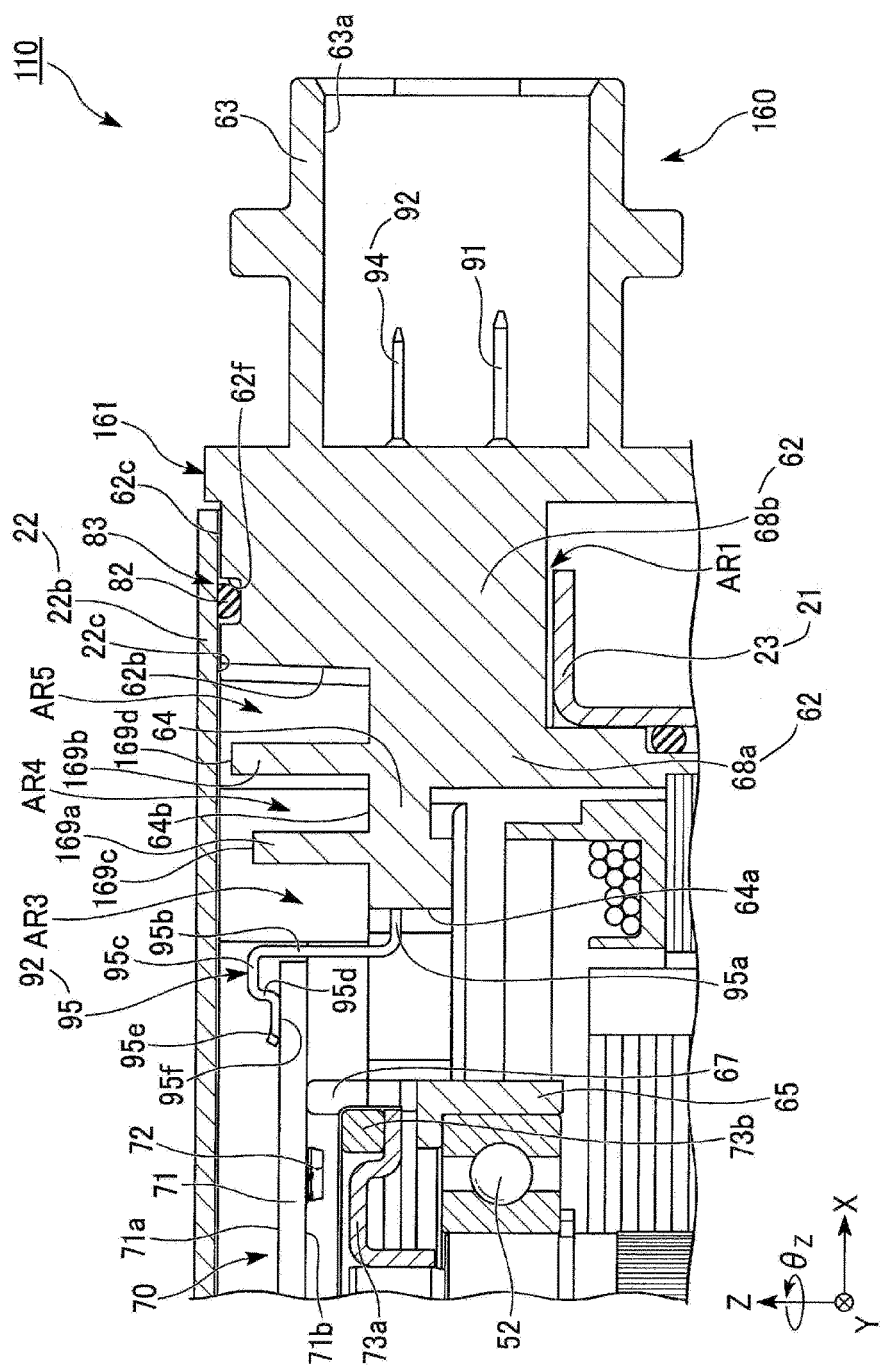
FIG. 5 is a partially cross-sectional view illustrating another example of the motor according to a preferred embodiment of the present invention.
Figure 6:
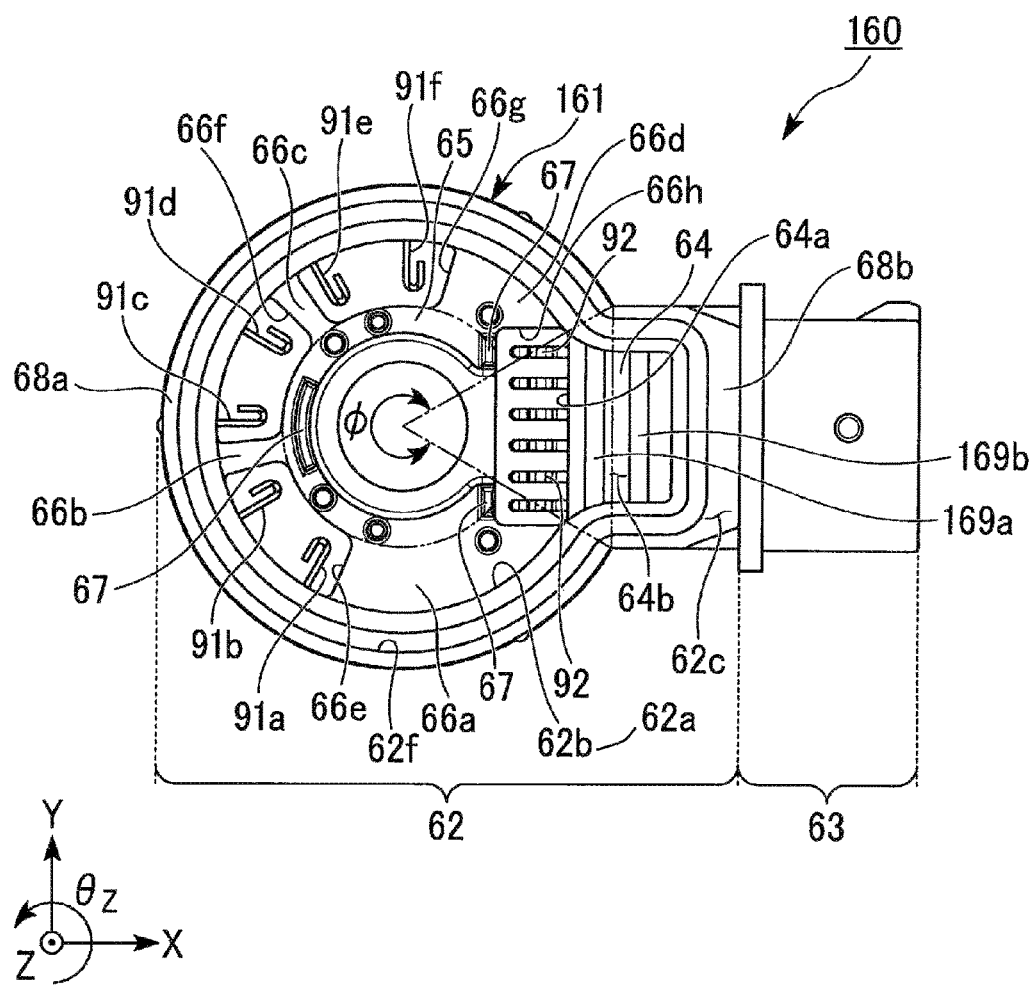
FIG. 6 is a plan view illustrating another example of a bus bar assembly according to a preferred embodiment of the present invention.

FIG. 5 is a partially cross-sectional view illustrating another example of the motor 110 according to a preferred embodiment of the present invention. FIG. 6 is a plan view illustrating another example of a bus bar assembly 160 of the motor 110 according to a preferred embodiment of the present invention. As illustrated in FIG. 5, the motor 110 includes a bus bar assembly 160. The bus bar assembly 160 includes a bus bar holder 161.

As illustrated in FIGS. 5 and 6, the bus bar holder 161 preferably includes a main body portion 62, a connector portion 63, a connection terminal holding portion 64, a rear bearing holding portion 65, connection portions 66a, 66b, 66c, and 66d, a plurality of circuit board support portions 67, an inner rib 169a, and an outer rib 169b. The inner rib 169a includes an inner rib protrusion surface 169c. The outer rib 169b includes an outer rib protrusion surface 169d.

The connection terminal holding portion 64 includes a holding portion rear surface 64b. The inner rib 169a and the outer rib 169b are disposed at the holding portion rear surface 64b of the connection terminal holding portion 64. That is, a plurality of ribs are preferably disposed at the holding portion rear surface 64b. The inner rib 169a and the outer rib 169b are disposed at a position spaced apart from the end of the radially inner side of the connection terminal holding portion 64 toward the radially outer side. The inner rib 169a is disposed at the radially inner side ahead of the outer rib 169b. The inner rib 169a is parallel or substantially parallel to the outer rib 169b in the radial direction. That is, the plurality of ribs including the inner rib 169a and the outer rib 169b are arranged in the radial direction.

The inner rib 169a and the outer rib 169b protrude from the holding portion rear surface 64b toward the rear side (+Z side) ahead of the circuit board 71. That is, the inner rib protrusion surface 169c is located at the rear side ahead of the circuit board rear surface 71a. The outer rib protrusion surface 169d is located at the rear side ahead of the circuit board rear surface 71a.

The inner rib protrusion surface 169c is disposed at the front side (−Z side) ahead of the outer rib protrusion surface 169d. That is, in the inner rib 169a and the outer rib 169b neighboring with each other, the end of the rear side (+Z side) of the inner rib 169a located at the radially inner side is located at the front side ahead of the end of the rear side of the outer rib 169b located at the radially outer side.

As illustrated in FIG. 5, a gap AR3 is defined in the radially inner side of the inner rib 169a. In the radial direction, the air gap AR3 is disposed between the circuit board 71 and the inner rib 169a. An air gap AR4 is disposed at the radially outer side of the inner rib 169a. The air gap AR4 is disposed between the inner rib 169a and the outer rib 169b in the radial direction. An air gap AR5 is located at the radially outer side of the outer rib 169b. The air gap AR5 is disposed between the outer rib 169b and the main body portion 62 in the radial direction.

Other elements of the inner rib 169a and the outer rib 169b are preferably identical to those of the rib 69 shown in FIGS. 1 to 4. Other elements of the motor 110 are preferably identical to those of the motor 10 shown in FIGS. 1 to 4.

According to this structure, the inner rib 169a and the outer rib 169b are disposed at a position spaced apart from the end of the radially inner side of the connection terminal holding portion 64 toward the radially outer side. Therefore, the air gap AR3 between the inner rib 169a and the circuit board 71 is able to be increased in volume. Therefore, when the circuit board 71 is connected to the circuit board connection terminal 95, the bus bar holder 61 is able to be prevented from being deformed by heat such as soldering.

In addition, according to the above-mentioned structure, the inner rib 169a and the outer rib 169b are disposed in the bus bar holder 161. That is, according to the above-mentioned structure, the plurality of ribs is disposed in the bus bar holder 161. Therefore, rigidity of the connection terminal holding portion 64 is improved even more.

In addition, according to this structure, the inner rib protrusion surface 169c of the inner rib 169a located close to the circuit board 71 is located at the front side ahead of the outer rib protrusion surface 169d. Therefore, when the circuit board 71 is connected to the circuit board connection terminal 95, the working space is easily increased in size, such that connection between the circuit board 71 and the circuit board connection terminal 95 is facilitated.

In addition, in the above-mentioned structure, the inner rib protrusion surface 169c of the inner rib 169a and the outer rib protrusion surface 169d of the outer rib 169b may also be located at the same position in the axial direction. Further, in the above-mentioned structure, the inner rib protrusion surface 169c may also be disposed at the rear side ahead of the outer rib protrusion surface 169d.

Figure 7:
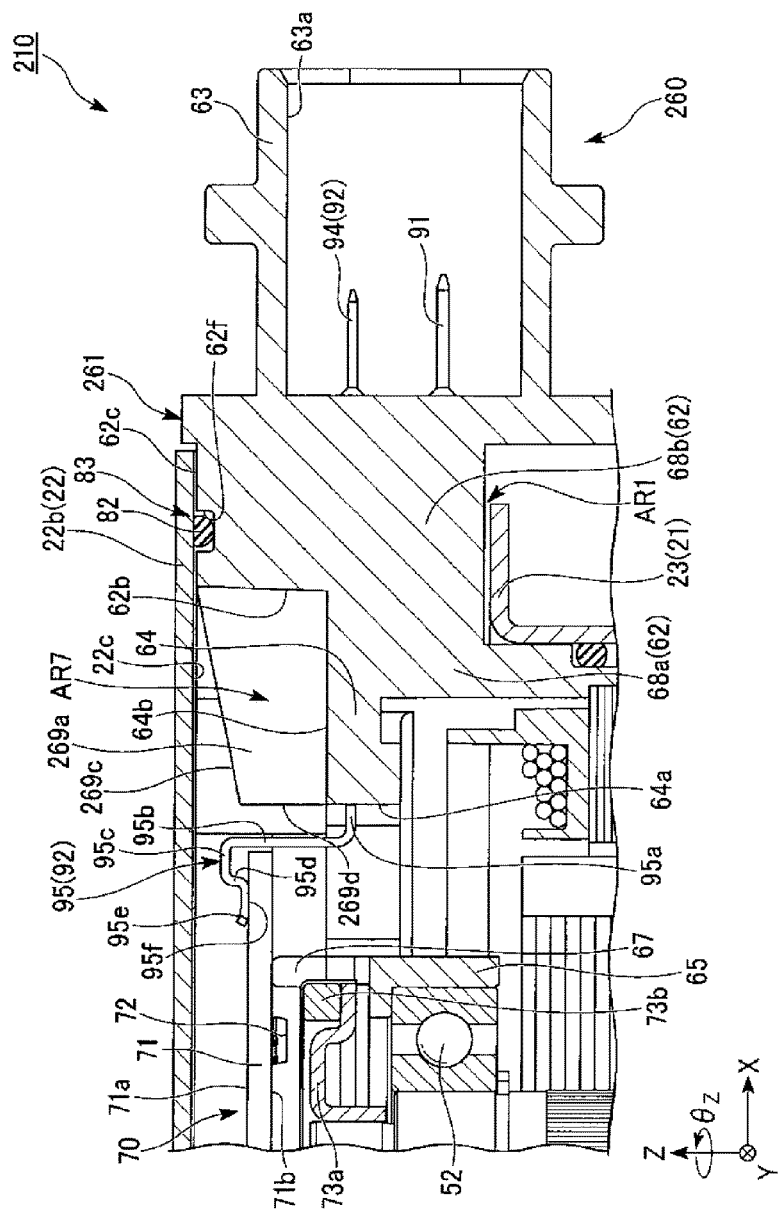
FIG. 7 is a partially cross-sectional view illustrating another example of the motor according to a preferred embodiment of the present invention.
Figure 8:
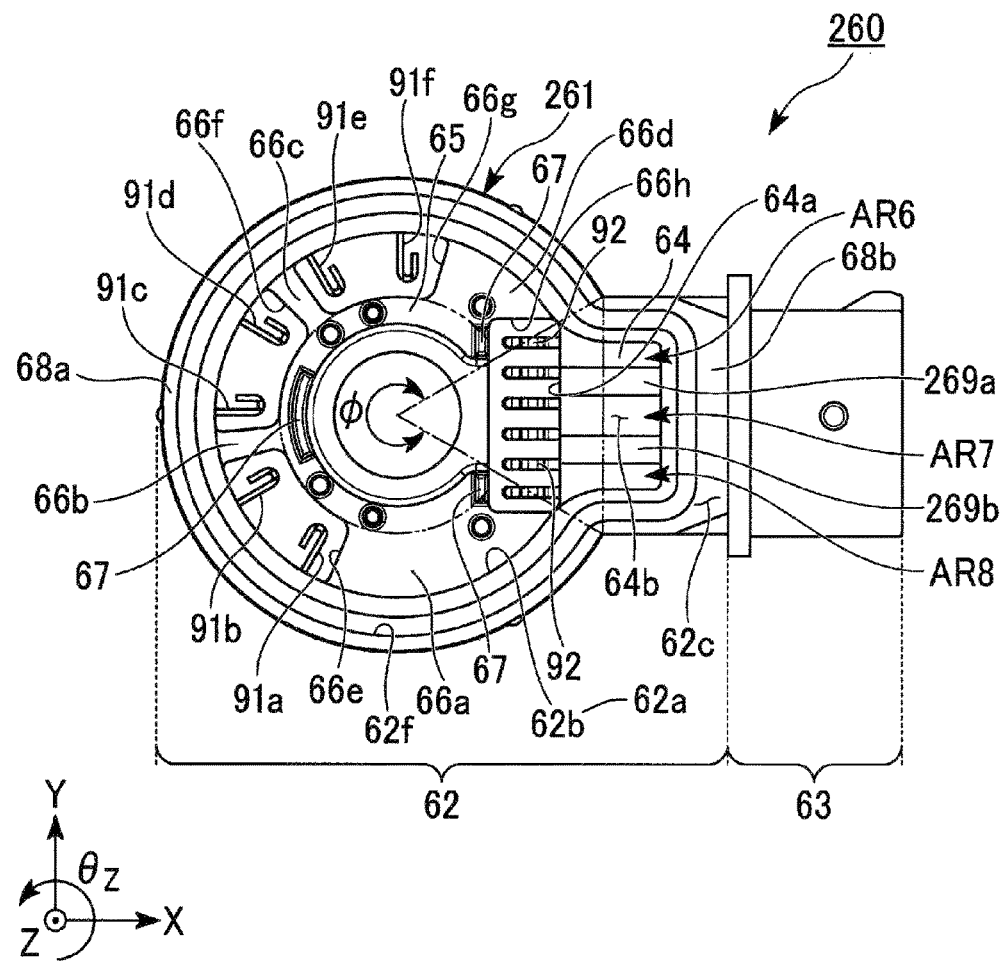
FIG. 8 is a plan view illustrating another example of a bus bar assembly according to a preferred embodiment of the present invention.

FIG. 7 is a partially cross-sectional view illustrating another example of the motor 210 according to a preferred embodiment of the present invention. FIG. 8 is a plan view illustrating another example of a bus bar assembly 260 of the motor 210 according to a preferred embodiment of the present invention. As illustrated in FIG. 7, the motor 210 includes a bus bar assembly 260. The bus bar assembly 260 includes a bus bar holder 261.

As illustrated in FIGS. 7 and 8, the bus bar holder 261 preferably includes a main body portion 62, a connector portion 63, a connection terminal holding portion 64, a rear bearing holding portion 65, connection portions 66a, 66b, 66c, 66d, a plurality of circuit board support portions 67, a first rib 269a, and a second rib 269b.

The first rib 269a and the second rib 269b are parallel or substantially parallel to the direction (Y-axis direction) perpendicular to the protrusion direction of the connector portion 63. The first rib 269a and the second rib 269b are preferably identical to each other, excepting structures and arrangement positions thereof. In the following description, only the first rib 269a will hereinafter be described as a representative example.

The first rib 269a is disposed at the holding portion rear surface 64b. The first rib 269a extends in the direction (X-axis direction) parallel or substantially parallel to the protrusion direction of the connector portion 63. The first rib 269a is disposed at the entirety of the protrusion direction (X-axis direction) of the connector portion 63, at the holding portion rear surface 64b. That is, the end of the radially outer side of the first rib 269a is connected to the main body inner surface 62b. In more detail, the end of the radially inner side of the first rib 269a is connected to the inner surface of the connector connection portion 68b of the main body portion 62. As illustrated in FIG. 7, the end (i.e., the first rib inner surface 269d) of the radially inner side of the first rib 269a is connected to the holding portion inner surface 64a without a step difference therebetween.

The first rib 269a includes a first rib protrusion surface 269c located at the rear side (+Z side). The first rib protrusion surface 269c is an inclined surface. The first rib protrusion surface 269c is gradually closer to the holding portion rear surface 64b in the direction from the radially outer side to the radially inner side. In other words, in the axial direction (Z-axis direction), the end of the rear side of the first rib 269a is gradually shifted from the rear side to the front side (−Z side) as the distance to the radially inner side becomes shorter. The entirety of the first rib protrusion surface 269c is located at the rear side ahead of the circuit board rear surface 71a. The axial distance between the first rib protrusion surface 269c and the cover portion 22b is gradually reduced in proportion to the reducing distance to the radially outer side. In the axial direction, the position of the end of the radially outer side of the first rib protrusion surface 269c is identical to that of the main body rear surface 62c.

As illustrated in FIG. 8, the air gap AR6 is preferably located at the +Y side of the first rib 269a. The air gap AR6 is disposed between the first rib 269a and the main body portion 62. The air gap AR7 is defined between the first rib 269a and the second rib 269b. The air gap AR8 is located at the −Y side of the second rib 269b. The air gap AR8 is located at −Y side of the second rib 269b. The air gap AR8 is disposed between the second rib 269b and the main body portion 62. The air gaps AR6, AR7, and AR8 are between the circuit board 71 and the main body portion 62 in the radial direction. Other elements of the motor 210 are preferably identical to those of the motor 10 shown in FIGS. 1 to 4, and as such a detailed description thereof will herein be omitted.

According to the above-mentioned structure, in the same manner as shown in the motor 110 of FIG. 5, a plurality of ribs are preferably used. Therefore, rigidity of the connection terminal holding portion 64 is further improved.

In addition, according to the above-mentioned structure, the first rib 269a and the second rib 269b extend in the direction parallel or substantially parallel to the protrusion direction of the connector portion 63. Therefore, the bending rigidity of the protrusion direction of the connector portion 63 at the connection terminal holding portion 64 is improved. As a result, according to the above-mentioned structure, when the axial force is applied to the connector portion 63, deformation of the connection terminal holding portion 64 is able to be further reduced or prevented.

The first rib protrusion surface 269c of the first rib 269a is gradually shifted from the rear side to the front side as the distance to the radially inner side is gradually reduced. In other words, the axial distance between the first rib protrusion surface 269c and the cover portion 22b is gradually reduced as the distance to the radially outer side is gradually reduced. Therefore, when the circuit board 71 is connected to the circuit board connection terminal 95, the working space is easily increased in size, such that connection between the circuit board 71 and the circuit board connection terminal 95 is facilitated.

Further, in the above-mentioned description, the first rib protrusion surface 269c may be a curved surface. The end of the rear side of the first rib 269a may be gradually changed in the direction from the rear side to the front side as the end of the rear side of the first rib 269a gradually moves from the radially outer side toward the radially inner side. The shape of the first rib 269a may be different from that of the second rib 269b.

Further, although the above-mentioned elements have disclosed that one or two ribs are provided, the scope or spirit of the present invention is not limited thereto. In the above-mentioned elements, the number of ribs is not limited thereto, for example, three or more ribs may be used as necessary.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a rotor including a shaft with a center on a center axis extending in one direction;
   a stator enclosing the rotor and rotating the rotor about the center axis;
   a first bearing located at a first side in the one direction of the stator and supporting the shaft;
   a second bearing located at a second side opposite to the first side of the stator and supporting the shaft; and
   a cylindrical housing holding the stator and the first bearing;
   a bus bar assembly holding the second bearing, and allowing an end of the first side to be located in the housing;
   a cover fixed to the housing to cover at least a portion of the second side of the bus bar assembly; and
   a circuit board disposed between the second bearing and the cover in the one direction, and allowing a surface of the second side to cross the one direction; wherein
   the bus bar assembly includes:
     a bus bar electrically connected to the stator;
     a wiring member electrically connecting an external power supply to the circuit board; and
     a bus bar holder holding the bus bar and the connection terminal;
   the bus bar holder includes:
     a cylindrical main body portion including an opening at the second side;
     a connector portion protruding from the main body portion toward a radially outer side of the center axis; and
     a connection terminal holding portion protruding from an inner surface of the main body portion toward a radially inner side, such that at least a portion of the connection terminal holding portion overlaps with the connector portion in a radial direction;

the main body portion is provided with a seal portion directly or indirectly contacting the cover along a circumferential direction of the center axis;

the wiring member includes:
- an external power-supply connection terminal provided to the connector portion to be electrically connected to the external power-supply; and
- a circuit board connection terminal which is fixed to the connection terminal holding portion at the first side ahead of an end of the second side of the main body portion and is electrically connected to the circuit board; and the surface of the second side of the connection terminal holding portion is provided with a rib protruding toward the second side ahead of the circuit board.

2. The motor according to claim 1, wherein the rib is connected to the inner surface of the main body portion.

3. The motor according to claim 1, wherein the rib extends in a direction crossing a protrusion direction of the connector portion.

4. The motor according to claim 1, wherein the rib extends in a direction parallel or substantially parallel to a protrusion direction of the connector portion.

5. The motor according to claim 1, wherein the rib is spaced apart from an end of the radially inner side of the connection terminal holding portion toward the radially outer side.

6. The motor according to claim 1, wherein the rib includes a plurality of ribs.

7. The motor according to claim 6, wherein the plurality of ribs are arranged in the radial direction; and
in ones of the plurality of the ribs neighboring each other, an end of the second side of the rib located at the radially inner side is located at the first side ahead of the end of the second side of the rib located at the radially outer side.

8. The motor according to claim 1, wherein in the one direction, a position of the end of the second side of the rib is shifted to the first side as a distance to the radially inner side is reduced.

9. The motor according to claim 1, wherein the main body portion includes a connector connection portion connected to the connector portion;
the bus bar holder contacts the end of the second side of the stator; and
a gap is defined between the connector connection portion and the housing in the one direction.

10. The motor according to claim 1, wherein the surface of the second side of the connection terminal holding portion is located at the first side ahead of the surface of the second side of the main body portion in the one direction.

11. The motor according to claim 1, wherein
the cover includes a cover flange portion at the end of the first side;
the housing includes a housing flange portion at the end of the second side; and
the cover flange portion is fixed to the housing flange portion.

12. The motor according to claim 1, wherein
the bus bar includes a coil connection portion that protrudes from the inner surface of the main body portion and is electrically connected to a coil of the stator; and
at least a portion of the coil connection portion overlaps with the circuit board in the radial direction.

13. The motor according to claim 1, wherein
the bus bar includes a coil connection portion that protrudes from the inner surface of the main body portion and is electrically connected to a coil of the stator; and
the connection terminal and the coil connection portion are located at different positions in a circumferential direction of the center axis.

14. The motor according to claim 1, wherein
the circuit board connection terminal includes a plate-shaped portion;
the plate-shaped portion includes a connection surface parallel or substantially parallel to the surface of the second side of the circuit board; and
the connection surface contacts the surface of the second side of the circuit board.

* * * * *